United States Patent [19]

Ito et al.

[11] Patent Number: 4,988,938
[45] Date of Patent: Jan. 29, 1991

[54] SYSTEM FOR CONTROLLING THE DRIVING OF A STEPPER MOTOR

[75] Inventors: Yukihiro Ito; Takashi Kimura; Reiji Hoshika, all of Tokyo, Japan

[73] Assignee: Copal Co. Ltd., Tokyo, Japan

[21] Appl. No.: 462,067

[22] Filed: Jan. 8, 1990

[30] Foreign Application Priority Data

Jan. 13, 1989 [JP] Japan ................................. 1-7323

[51] Int. Cl.$^5$ .............................................. H02P 8/00
[52] U.S. Cl. ...................................... 318/696; 318/685
[58] Field of Search .............................. 318/696, 685

[56] References Cited

U.S. PATENT DOCUMENTS 4,595,871  6/1986  Koehler ............................. 318/696
4,600,868  7/1986  Bryant ............................... 318/696

Primary Examiner—William M. Shoop, Jr.
Assistant Examiner—Saul M. Bergmann

[57] ABSTRACT

A system for controlling the driving of a stepper motor which is rotated by the driving pulses generated based on the two-phase excitation system for rotating a driven system is disclosed herein comprises when the frequency of said driving pulses is outside of the resonance ranges of said stepper motor and some predetermined component parts of said driven system, respectively, the driving pulses generated based on said two-phase excitation system are applied to said stepper motor to rotate the same, but when the frequency of said driving pulses is within said resonance ranges, a brake pulse and a power suppression portion are added to said driving pulses so that said stepper motor is caused to rotate without causing resonance and can be stopped at a predetermined position with a high degree of accuracy and furthermore noise can be suppressed to a minimum.

1 Claim, 6 Drawing Sheets

SYSTEM FOR CONTROLLING THE DRIVING OF A STEPPER MOTOR

DETAILED DESCRIPTION OF THE INVENTION

1. Field of the Invention

The present invention relates to a system for controlling the driving of a stepper motor and more particularly a system for controlling the driving of a stepper motor which can be rotated by the two-phase excitation system driving pulses without causing greater noise.

2. Background of the Invention

In general, the stepper motors can control correctly the angle of rotation so that they are used as driving sources for the driven systems such as peripheral equipment of the information processing systems, NC machine tools and so on.

For instance, a driving source is used as a floppy disk driving unit of the information processing system. In the floppy disk drive unit, a stepper motor is used as a driving source for displacing a read/write head for reading out or writing information at a predetermined place on a recording medium such as a magnetic disk or the like.

More particularly, the stepper motor drives a lead screw in the clockwise or counterclockwise direction so that a carriage which is threadably engaged with the lead screw for movement in the axial direction thereof is displaced, whereby a head mounted on the carriage is displaced in the direction of a predetermined track of a recording medium. In this case, the stepper motor is driven by the driving pulses generated by a two-phase excitation system which ensure the head to stop at a predetermined position with a high degree of accuracy and which have a low possibility of distorting a desired hysteresis.

However, when the lead screw or the like is rotated by applying the stepper motor the driving pulses generated by the two-phase excitation system and if the frequency of the driving pulses is within a resonance frequency band of the stepper motor itself and/or the lead screw, the carriage and the head in the driven system, large oscillations of the stepper motor and the driven system result so that in the case of the displacement of the head, greater seek noise is produced.

In order to solve this problem, the stepper motors had to be energized by other excitation systems which are inferior to the two-phase excitation system in the accuracy for stopping the head at a desired position and which cause a low degree of seek noise.

However, in response to the recent demand for the operation with a high degree of accuracy of the driven system, the realization of a system for controlling the driving of a stepper motor which can stop the head at a predetermined position with a high degree of accuracy and which can suppress seek noise has been desired.

BRIEF SUMMARY OF THE INVENTION

In view of the above, the present invention was made to solve the above and other problems and has for its object to provide a system for controlling the driving of a stepper motor so that the stepper motor can be rotated and stopped so as to locate the head at a predetermined position with a high degree of accuracy and seek noise can be reduced to a minimum.

To the above and other ends, in s system for controlling the driving a stepper motor which rotates a driven system and is rotated by applying thereto the driving pulses generated based on the two-phase excitation system, according to the present invention, when the frequency of the driving pulses is outside of the resonance regions of the stepper motor and some predetermined component parts of the driven system, respectively, the driving pulses generated based on the two-phase excitation system are applied to the stepper motor to rotate the same, but when the frequency of the driving pulses are within the above-mentioned resonance regions, a brake pulse and a power suppression portion are added to the driving pulses so that the stepper motor is caused to rotate without causing resonance.

According to the control system in accordance with the present invention just described above, the driving pulses generated based on the two-phase excitation system are applied to the stepper motor to rotate the same. When the frequency of the driving pulses are outside of the resonance frequency regions of the stepper motor and some predetermined component parts of the driven system, the driving pulses are applied to the stepper motor without accompanying any modification, but the frequency of the driving pulses is within the above-mentioned resonance regions, a brake pulse and a power suppression portion are added to the driving pulses. Therefore it becomes possible to rotate the stepper motor always by suppressing noise and stop it at a predetermined position with a high degree of accuracy.

The system for controlling the driving of a stepper motor in accordance with the present invention is designed and constructed in the manner just described above, the stepper motor which is driven based on the two-excitation system can be stopped at a predetermined position with a high degree of accuracy and furthermore noise can be suppressed to a minimum.

BRIEF DESCRIPTION OF THE DRAWINGS

FIG. 1 is a top view thereof;

FIG. 2 is a sectional view taken along the line II—II of FIG. 1;

FIG. 3 is a flowchart of the control system of the present invention;

FIG. 4 is a flowchart used to explain the suppression of noise in accordance with the present invention;

FIG. 5 is a diagram illustrating the driving pulses of a conventional two-phase excitation pattern and a noise suppression pattern;

FIG. 6 is a diagram illustrating the driving pulses when a head is stopped in a noise suppression pattern; and FIG. 7 is a diagram illustrating displacement patterns of the head displaced in accordance with the present invention.

DETAILED DESCRIPTION OF THE EMBODIMENTS

Now a preferred embodiment of the present invention will be described in detail with reference to FIGS. 1-7.

Figure 1:
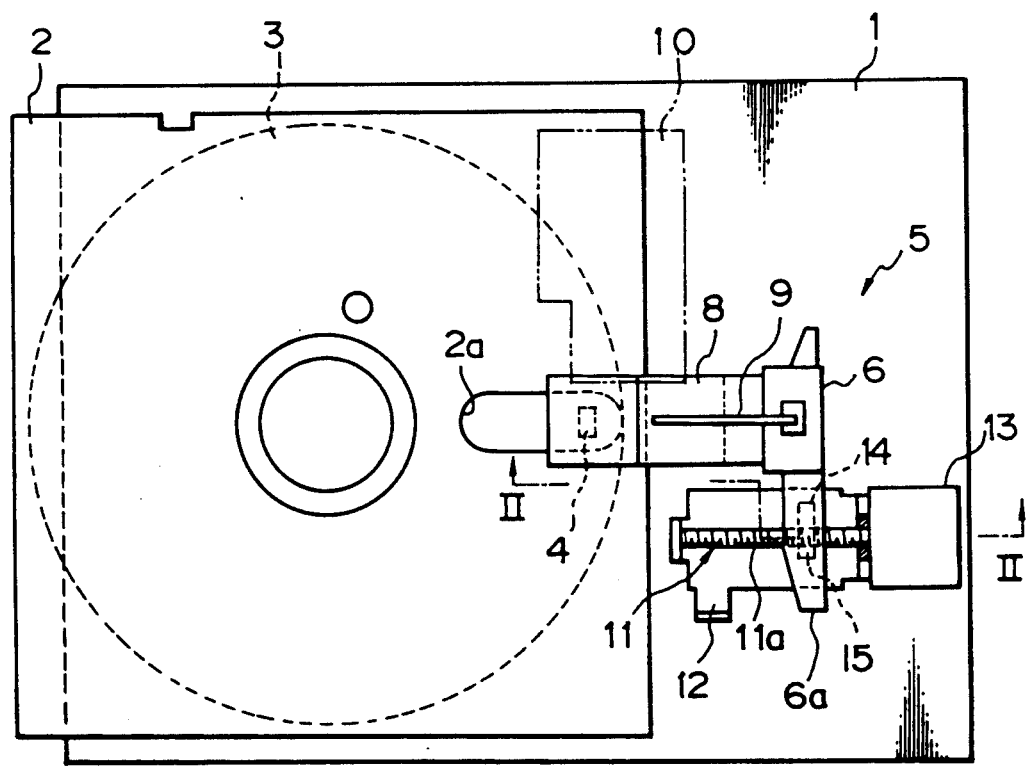
FIGS. 1 and 2 illustrate a floppy disk drive unit which is one example of a driven system which is driven by a system for controlling the driving of a stepper motor in accordance with the present invention.
Figure 2:
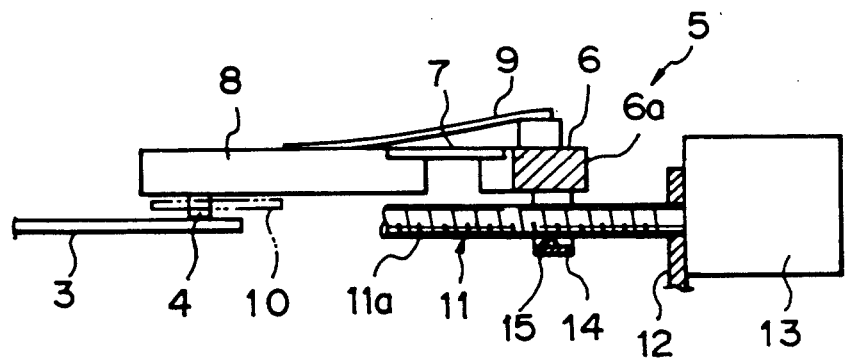

The embodiment illustrates a case in which the floppy disk unit shown in FIGS. 1 and 2 is rotated as a driven system.

Referring first to FIGS. 1 and 2, the driven system will be described.

Various component parts are mounted on a base 1 substantially in the form of a rectangle. A floppy disk 3 encased in a jacket 2 is inserted into or withdrawn from the left side of the base 1 and when the floppy disk 3 is inserted into the base 1, it is clamped at the position indicated by the solid lines in FIG. 1 by a chuck (not shown) and then is rotated at a predetermined rotational speed by a rotary machine (not shown). On the right side beyond the jacket 2 of the base 1 is disposed a head drive unit 5 which drives a read/write head 4 over the surface of the floppy disk 3 in the direction perpendicular to a plurality of tracks; that is, in the direction in which the head 4 moves from one track to another. The head 4 is securely attached to the undersurface of a leading portion of a head supporting member 8 which in turn is securely attached through a leaf spring 7 to a carriage in such a way that the head 4 is in opposing relationship with the surface of the floppy disk 3 through a window 2a of the jacket 2. The carriage 6 is supported by a supporting member (not shown) in such a way that it can reciprocates in the radial direction of the floppy disk 3. A head biasing spring 9 in the form of a wire spring is disposed so that it can bias a head supporting member 8 toward the floppy disk 3 against the leaf spring 7. A mechanism 10 for making the head 4 into contact with the surface of the floppy disk 3 or lifting it away therefrom (to be referred to as "the head contact-lift mechanism" in this specification for brevity) is disposed below the head supporting member 8 so that the head supporting member 8 and the head 4 can be lifted away from the surface of the floppy disk 3 against the force of the head biasing spring 9 or the lifting force can be released, whereby the head 4 is made into contact with the surface of the floppy disk 3. A lead screw 11 is rotatably extended from a lead screw supporting member 12 in the radial direction of the flopy disk 3 below an extension 6a of the carriage 6. The lead screw 11 is directly connected to a stepper motor 13 which is a driving unit. An engaging pin 15 extended from the free end of a leaf spring 14, whose the other end is securely attached to the carriage 6, is threadably engaged with an externally threaded portion 11a of the lead screw 11 so that depending upon the rotation of the lead screw 11 in the clockwise or counterclockwise direction, the carriage 6 and the head 4 are moved in the radial direction of the floppy disk 3.

In the case of the floppy disk unit with the above-described construction, when the head supporting member 8 and the head 4 are lifted by the head contact-lift mechanism 10, the jacket 2 is inserted into the floppy disk unit and then the floppy disk 3 is clamped by the chuck at a predetermined position and then rotated. Thereafter the force for lifting the head supporting member 8 of the head contact-lift mechanism 10 is released so that the head 4 is made into contact with the surface of the floppy disk 3 in the correct state under the force of the head biasing spring 9, whereby information is read out or written on the surface of the floppy disk 3.

In the case of switching the head 4 from one track to another of the floppy disk, a predetermined number of driving pulses generated by the two-phase excitation system in accordance with the present invention are applied to the stepper motor 13 so that the motor 13 is rotated in the clockwise or counterclockwise direction. Then the lead screw 11 is rotated by a predetermined number of rotations so that the position at which the externally threaded portion 11a of the lead screw 11 and the engaging pin 15 engage with each other is displaced in the axial direction of the externally threaded portion 11a. As a result, the head 4 and the carriage 6 are displaced in the radial direction of the floppy disk 3. Thus, the operation of switching the head 4 from one track to another of the floppy disk 3 is accomplished.

Next referring to FIGS. 3-7, the driving method of the stepper motor 13 will be further described.

Figure 3:
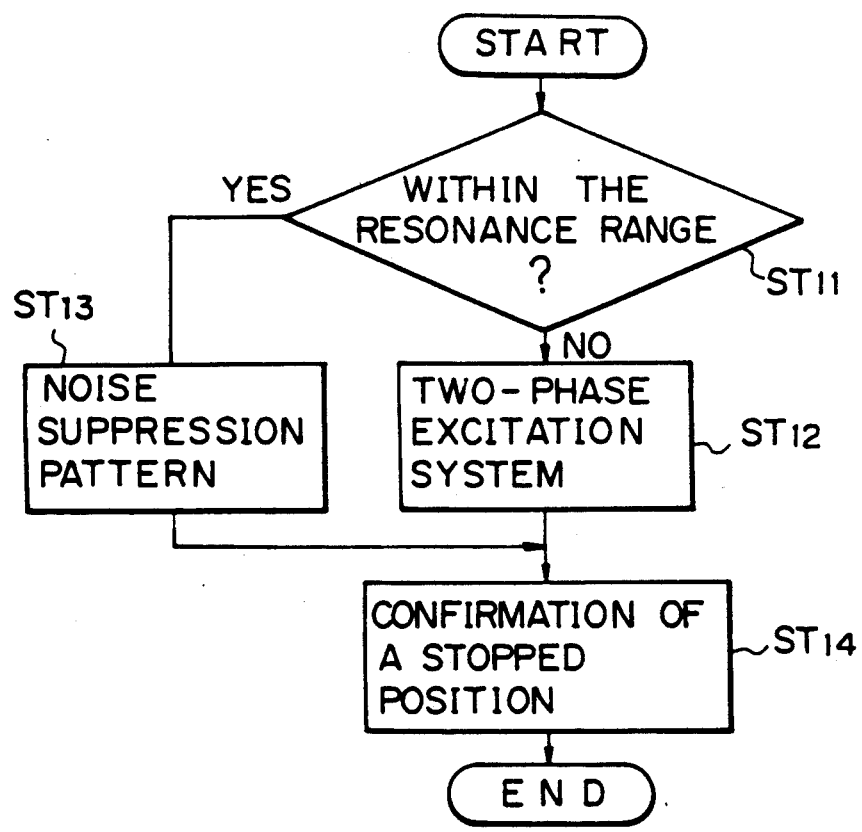
FIGS. 3-7 illustrate a preferred embodiment of the present invention.

As shown in FIG. 3, according to the present invention, when the rotation command is applied to the stepper motor 13, in the step $ST_{11}$, it is detected whether or not the frequency of the driving pulses is within the resonance frequency band (for instance, 125 Hz–250 Hz) of the stepper motor 13 and/or the resonance frequency band of the driven system. When the result is "NO", the procedure proceeds to the step $ST_{12}$ so that the driving pulses generated by the conventional two-phase excitation system are applied to the stepper motor 13. On the other hand, when the result is "YES", the operation proceeds to the step $ST_{13}$ so that the driving pulses of the noise suppression pattern are applied to the stepper motor 13. In either case, in the step $ST_{14}$, the position at which the head 4 is stopped (to be referred to as "the stop position" in this specification) is determined and then the stepper motor 13 is stopped at a suitable position. Thus the rotary motion is stopped.

Figure 5:
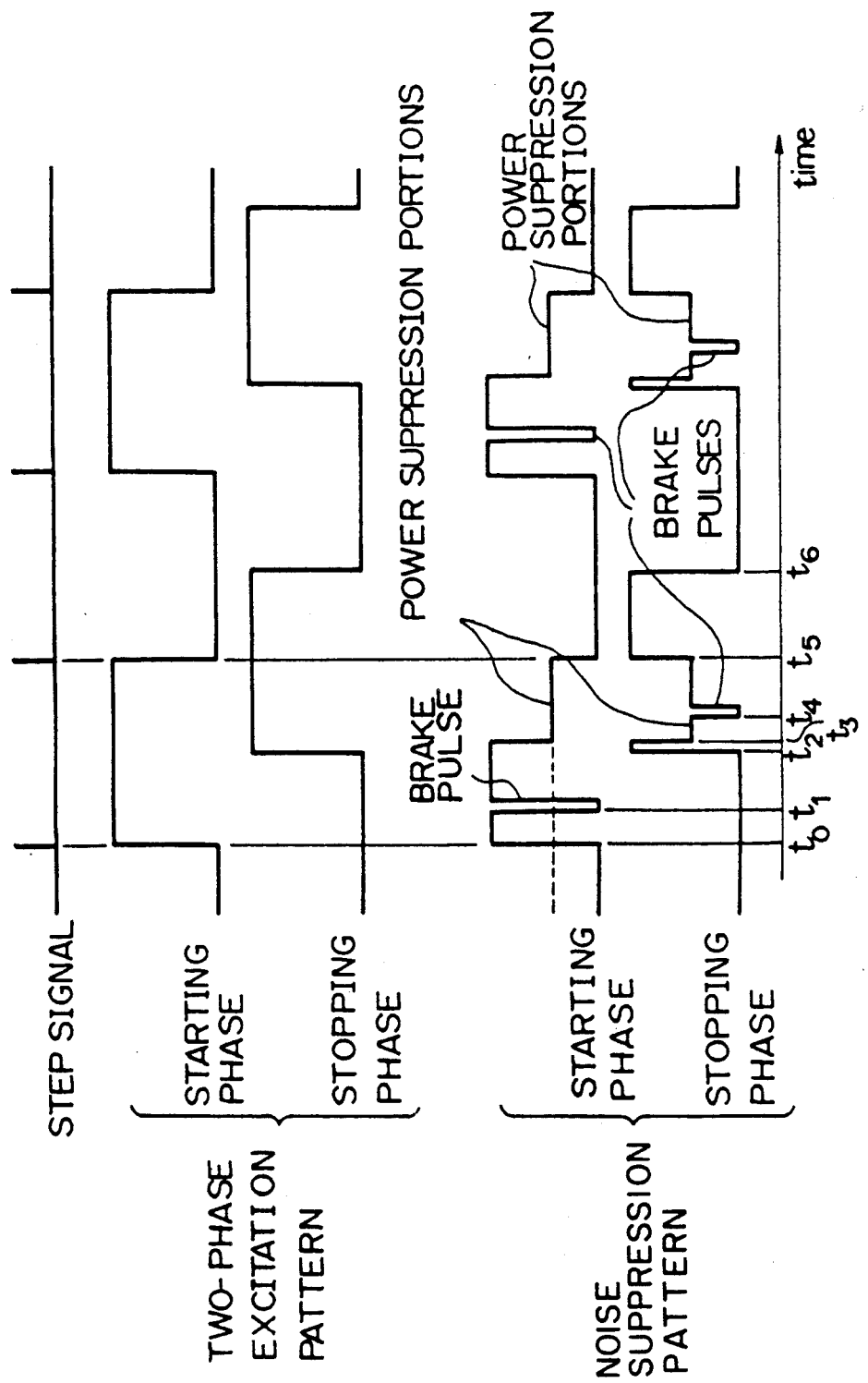

As shown in FIG. 5, in the case of the conventional two-phase excitation system, in response to the input of the step signal, the starting-and stopping-phase driving pulses are generated and applied to the stepper motor 13 so that the latter rotates through a predetermined angle and then stops. In this case, the frequency of the driving pulses is not a resonance frequency so that the driven system such as the stepper motor 13 and the lead screw 11 are driving without causing great noise. Furthermore the head 4 can be stopped at a predetermined position with a high degree of accuracy.

Figure 4:
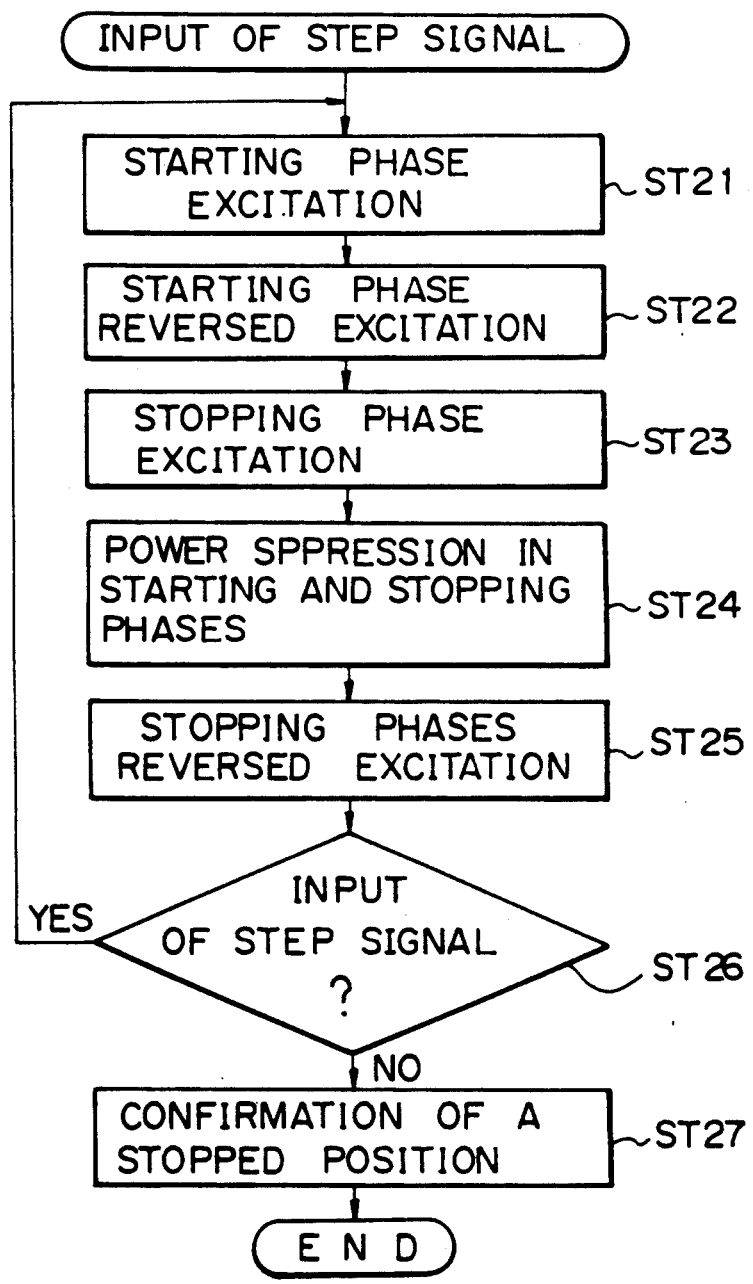

In the case of the other noise suppression pattern, according to the flowchart shown in FIG. 4, the noise-suppression-pattern driving pulses as shown in FIG. 5 are applied to the stepper motor. In this case, the driving pulses consist of the starting-and stopping phase driving pulses generated based on the conventional two-phase excitation system plus the brake pulses and the power suppression portions.

More particularly, as shown on the left side of FIG. 5, when the step signal is delivered at t0, the starting-phase driving pulse is generated as the starting phase excitation in the step $ST_{21}$ shown in FIG. 4 and at t1 the brake pulse is added to the starting-phase driving pulse as the starting phase reversal excitation in the step $ST_{22}$. At t2 the stopping-phase driving pulse is generated as the stopping phase excitation in the step $ST_{23}$. Thereafter from t3 to t5 the input of the power suppression portion for decreasing the voltage of the driving pulses of both phases less than ½ continues as the starting-and stopping-phase power suppression in the step $ST_{24}$. At t4, as the stopping-phase reversal excitation in the step $ST_{25}$, the brake pulse is added to the stopping-phase driving pulse and at t5 it is detected whether or not the step input exists in the step $ST_{26}$. When the input of the step signal exists as shown in FIG. 5, the result of the detection is "YES" so that the operation starting from the step $ST_{21}$ is repeated. At t5 the starting-phase driving pulse rises and at t6 the stopping-phase driving pulse falls. Next after waiting the input of the next step signal, the application of the driving pulses in both phases is repeated.

Figure 6:
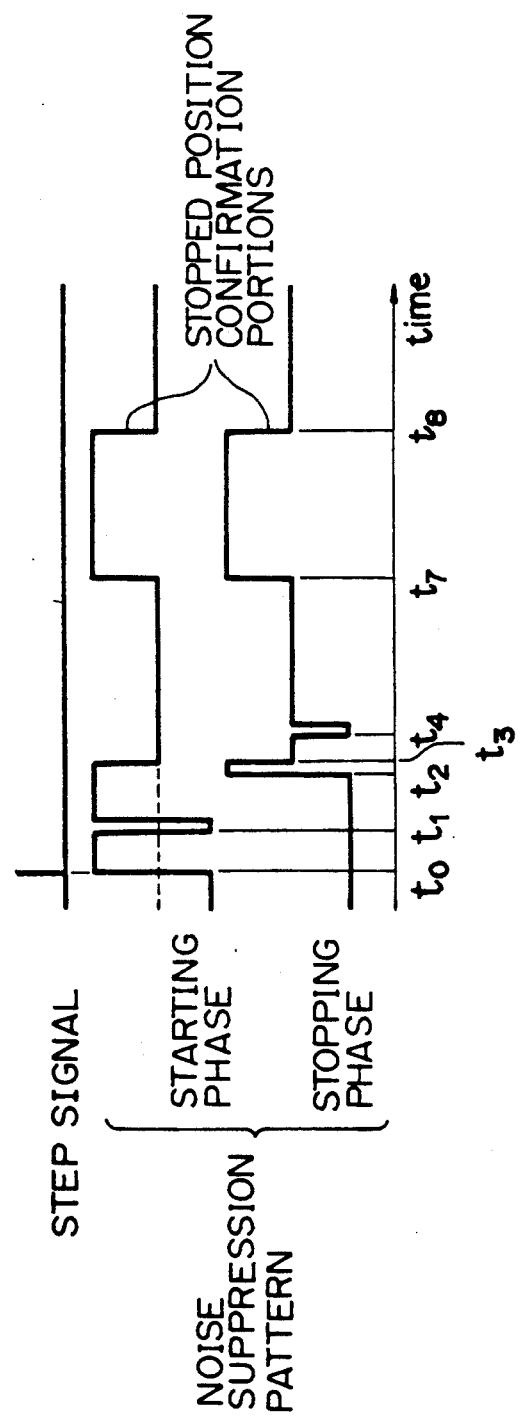

However, as shown in FIG. 6, there is no input of the step signal at t5 in the step $ST_{26}$, the result of the detection is "NO" so that the operation proceeds to the step $ST_{27}$ and during from t7 to t8 the driving pulses in both phases rise to the maximum voltages, respectively so that the stepper motor 13 is stopped.

Next the noise suppression mode based upon the noise suppression pattern will be described with reference to FIG. 7.

Figure 7:
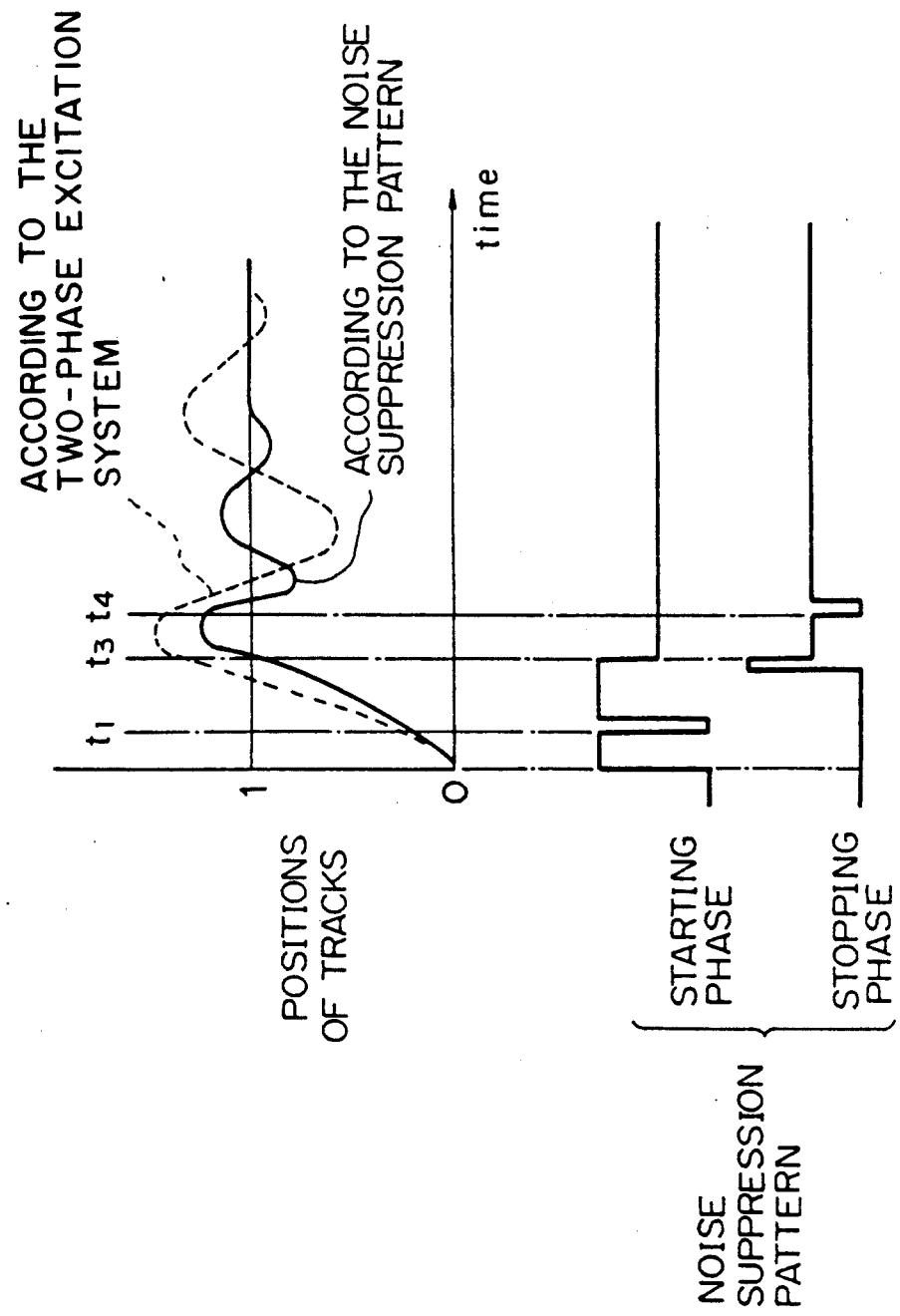

In FIG. 7, the solid line in the uppermost characteristic diagram indicates a degree of accuracy with which the head 4 is located at a predetermined track of the floppy disk 3 when the starting-and stopping-phase driving pulses generated according to the noise suppression pattern in accordance with the present invention are applied to the stepper motor 13. The broken line in FIG. 7 indicates a degree of accuracy with which the head is located at a predetermined track when the driving pulses generated by the conventional two-phase excitation system are applied. According to the noise suppression pattern of the present invention, the rise which is too fast is suppressed by the addition of the brake pulse to the starting phase at t1 and from t3 the power suppression portions are added to both phases so that the holding torque is decreased so as to suppress too great downward damping. At t4 the brake pulse is added to the stopping phase so that the out of step control of the stepper motor 13 is prevented. Therefore, as is apparent from the comparison between the solid and broken line characteristic curves shown in FIG. 7, according to the noise suppression pattern of the present invention, it becomes possible to suppress the amplitude of oscillations of the head 4 and suppress the damping earlier so that even in the resonance frequency band, noise is extremely suppressed while the stepper motor 13 is driven. Furthermore, the driving pulse in each phase generated by the two-phase excitation system is changed or deformed so that each component part can be stopped at its predetermined position with a high degree of accuracy.

As described above, according to the above-described embodiment of the present invention, when the frequency of the driving pulses enters the resonance frequency bands of the stepper motor 13 and some predetermined component parts of the driven system, the brake pulse and the power suppression portion are added to the driving pulses. As a result, it becomes possible to suppress noise to a minimum so that the driving pulses generated based on the two-phase excitation system are applied to the stepper motor 13 to rotate the same. Therefore, the accuracy with which the stepper motor 13 is stopped can be maintained at an extremely high degree.

In the above-described embodiment, the driven system has been described as the floppy disk unit, but it is apparent to those skilled in the art that the present invention may be equally applied to other driven systems.

It is to be understood that the present invention is not limited to the embodiments described above and that various modifications can be effected as needs demand without leaving the true spirit of the present invention.

What is claimed is:

1. A system for controlling the driving of a stepper motor which is rotated by pulses generated based on a two-phase excitation system for rotating a driven system, CHARACTERIZED IN THAT when the frequency of said driving pulses is outside of the resonance ranges of said stepper motor and predetermined, component parts of said driven system, respectively, applying the driving pulses generated based on said two-phase excitation system to said stepper motor to rotate the same, but when the frequency of said driving pulses is within said resonance. ranges, adding a brake pulse and a power suppression portion of a noise suppression pattern to said driving pulses so that said stepper motor rotate without causing resonance.

* * * * *